Patented May 2, 1939

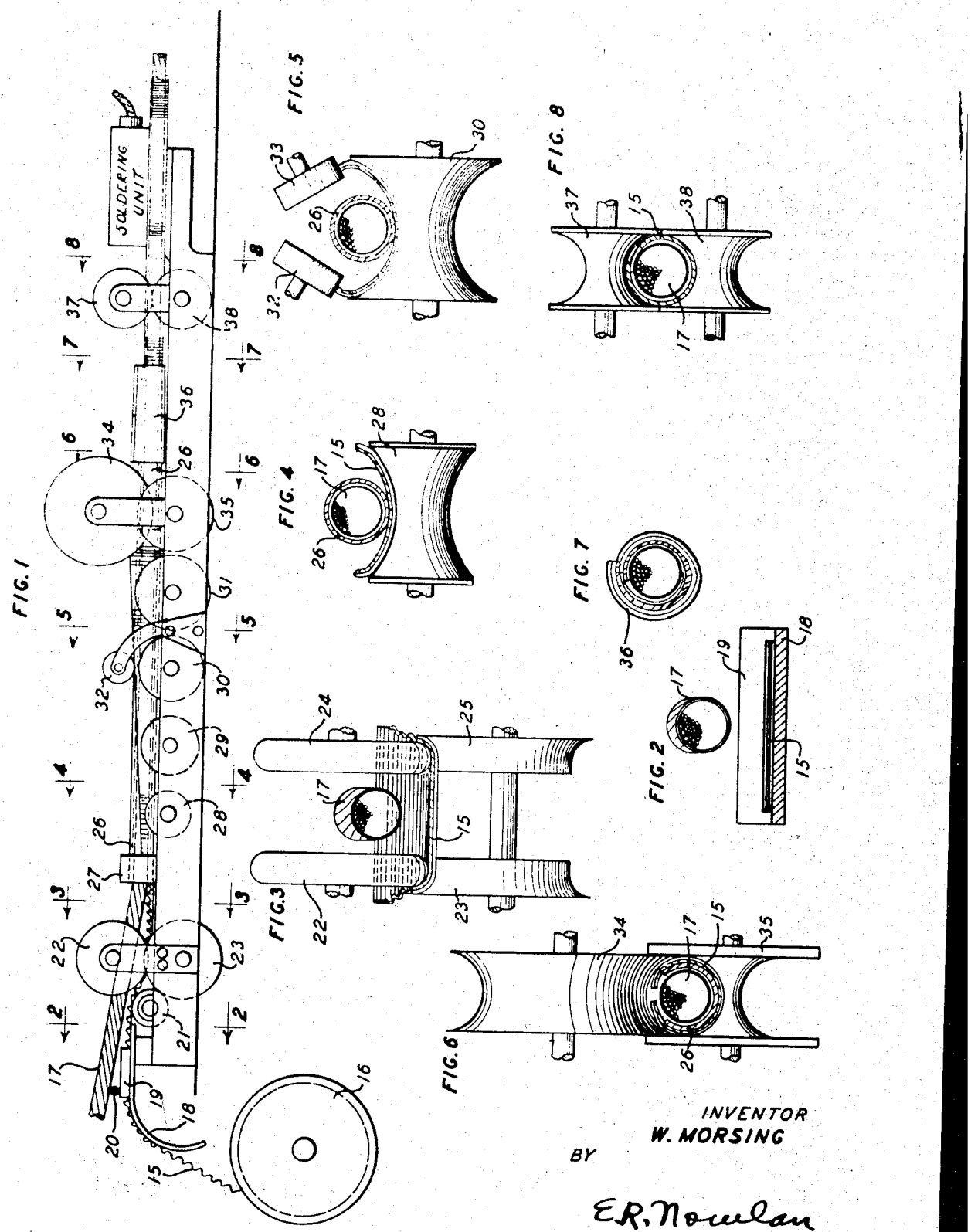

2,156,952

UNITED STATES PATENT OFFICE 2,156,952

METHOD OF AND APPARATUS FOR MAKING CABLE

William Morsing, Irvington, N. J., assignor to Western Electric Company, Incorporated, New York, N. Y., a corporation of New York Application December 12, 1936, Serial No. 115,566

12 Claims. (Cl. 113—33)

This invention relates to a method of and apparatus for making cable and more particularly to a method of and apparatus for forming and assembling component elements of electrical cables having an insulated conductor core enclosed in a metallic sheath.

Certain types of electrical cables particularly adapted for use in the communications arts have a central core comprising one or more conductor strands covered with insulating material and a metallic protective sheath thereover formed of a transversely corrugated ribbon or tape of relatively thin sheet metal, usually copper, brass, aluminum or the like, applied longitudinally to the core and formed into a tube about the core, the abutted or overlapping edges of the metal tape being secured together, as by welding, soldering or the like. It may be of essential importance that the edges of the tape be accurately and correctly brought together so that the corrugations of the completed tubular sheath present complete and independent rings around the cable and not one or more helically connected convolutions.

An object of the present invention is to provide a method and an apparatus for forming a transversely corrugated metal tape longitudinally about a core, simply and effectively, and in such fashion as to minimize unintended distortion of the tape during the operation.

One embodiment of the invention contemplates a method and apparatus comprising steps of and means for supplying a preformed cable core, supplying a transversely precorrugated metal tape, flexing the tape arcuately of its length while simultaneously bending the edge portions only of the tape to a transversely arcuate form of substantially the ultimately desired transverse radius, bringing the core into contact with the inner surface of the tape, and folding the tape longitudinally about the core.

Other objects and features of the invention will clearly appear from the following detailed description of one embodiment thereof taken in connection with the accompanying drawing in which the same reference numerals are applied to identical parts in the several figures and in which Fig. 1 is a schematic view in side elevation of an apparatus for carrying out the method of the invention;

Fig. 2 is an enlarged section on the line 2—2 of Fig. 1;

Fig. 3 is an enlarged section on the line 3—3 of Fig. 1;

Fig. 4 is an enlarged section on the line 4—4 of Fig. 1;

Fig. 5 is an enlarged section on the line 5—5 of Fig. 1;

Fig. 6 is an enlarged section on the line 6—6 of Fig. 1;

Fig. 7 is an enlarged section on the line 7—7 of Fig. 1, and

Fig. 8 is an enlarged section on the line 8—8 of Fig. 1.

In the apparatus herein disclosed, a transversely straight and relatively thin metal tape 15 having preformed transverse corrugations is drawn from a supply 16 of any suitable kind, and is to be folded longitudinally about a substantially cylindrical core 17 drawn from a supply not shown. The tape 15 passes up from the supply 16 over the curved lip of a fixed guide 18 and through a guide member 19 which is merely a fixed block having a slot therethrough barely larger than the gross cross-section of the corrugations of the tape. The purpose of this guide 19 is to prevent lateral displacement of the tape just beyond the guide.

Above the block 19 is a fixedly positioned idler guide roll 20 over which the core 17 passes and is prevented from sagging down on the tape 15 prematurely.

From the block 19 the tape 15 passes over a bending roll 21 and between two pair of edge curving rolls 22, 23 and 24, 25. Upper rolls 22 and 24 of these pairs are formed with convexly rounded peripheries, while the peripheries of the respective coacting rolls 23 and 25 are correspondingly concave as shown in Fig. 3; and the rolls of each coacting pair are spaced apart by a distance corresponding to the height of the corrugations of the tape. The bending roll 21 is positioned in front of the rolls 22 and 24, with its top above the bottom of these latter, and spaced from them by about the height of the corrugations of the tape. None of these five rolls is corrugated.

As the tape passes over the roll 21 and under the rolls 22 and 24, the tape is bent or curved longitudinally of itself, being compelled to follow the circumferential curvature of the rolls 22 and 24 over a considerable arc thereof (as shown about 45°) before entering between the pairs 22, 23 and 24, 25 and is held to this longitudinal curvature while the pairs 22, 23 and 24, 25 are forcing the edge portions of the strip to assume the transverse curvature of the convex peripheries of the rolls 22 and 24.

The tape is easily flexible longitudinally, but stiff transversely, and the longitudinal curvature imposed by rolls 21, 22 and 24 is immediately straightened out and lost as the tape is drawn out from between the rolls 22, 23 and 24, 25. The transverse curvature imposed by the combined action of all five rolls 21, 22, 23, 24 and 25, on the edge portions of the tape is however permanent, and these rolls are so dimensioned and related that the tape emerges from them with its edge portions permanently curled up on a radius equal to or slightly less than the radius of the core 17, substantially as shown in Fig. 4.

The rolls 21, 22, 23, 24 and 25 are all idlers driven only by the tape being drawn between them. Rolls 23 and 25 may conveniently be rigidly mounted on a common rotatable shaft to keep them in step with each other; but rolls 22 and 24 are preferably independent with a clear space between to pass the core.

If the roll 21 were omitted and the tape passed in a flat plane into the edge bending rolls 22, 23 and 24, 25, these latter would tend to flatten the transverse corrugations of the tape at the curled edges. This would stretch or lengthen the edge portions relatively to the uncurled central part and the tape would warp, twist and become difficult to control. However, because of the double curvature imposed on the edges of the tape while being curled by the addition of roll 21 to the other four, the corrugations are crowded together while being curled, and if the dimensions and relations of the five rolls are suitably chosen, the edge curled tape emerges from the operation without any deformation except the curling (and possibly a slight transversely uniform stretching) and so has no tendency to warp or twist.

This action of imposing double curvature to curl the edges of the tape and the five rolls and their mode of operation are important and characteristic features of the invention.

A little beyond the edge bending rolls just discussed the core enters a tubular guide 26 conveniently supported in stationary members 27 and 36. The member 27 has a slot below the mouth of the guide 26 to pass the tape which moves on in contact with the outer under side of the guide as indicated in Fig. 4 and is supported on suitable idlers 28, 29, 30 and 31, which in co-action with the guide 26 begin the process of folding the tape longitudinally into a sheath about the core. Each of the rolls 28, 29, 30 and 31 is concave and of slightly sharper curvature than the preceding one.

The roll 30 is associated with a pair of idler guide rolls 32 and 33 which run on the now upturned edges of the now generally U-shaped tape and ensure its not twisting or shifting laterally.

By the time the tape leaves the roll 31 it has been formed as far as a roll coacting with the guide 26 can be effective, and hence is brought, still in contact with the guide 26, between a pair of coacting forming rolls 34 and 35 (Fig. 6). The lower roll 35 is concaved to hold the middle part of the tape firmly against the convex under side of the guide, while the upper roll 34 is concaved to form down the two edge portions of the tape upon the convex upper side of the guide. To enable this action, the roll 34 is formed, as shown in Fig. 6, to fit down into the roll 35.

As the outer circumference of the guide 26 is larger than that of the core, the tape although tubular now is not yet completely closed, there being a gap between the adjacent extreme edges of the tape. Because of the precurvature of the edge portions by the rolls 22, 23 and 24, 25, the extreme edges of the tape now face each other squarely and must next be brought to abut or preferably overlap.

The guide 26 ends at the member 36 and as they leave the guide 26 the core and tape meet for the first time in the member 36. This member 36 is a stationary element consisting principally of a rigid sheet of metal having the form of a spiral cone as indicated in Figs. 1 and 7.

As the tape containing the core passes into and through the member 36, it presses by virtue of its inherent elasticity gently against and is conformed to the inner surface of the spiral cone. Thus one edge of the tape (in this case the right hand one) is guided to lie radially over the other as the cone forces the tubular tape to smaller diameter. Care must be taken in originally threading the tape and core into the apparatus, to see that the corrugated edges of the tape are properly matched as the tape closes on itself in the member 36. Once properly matched to start with, they will continue so throughout any continuous length of tape.

The core enveloped in the overlappingly closed tape then passes on through a pair of coacting compacting idler rolls 37 and 38 where the sheath is brought down to its final outer dimension.

The process is then complete so far as the present invention is concerned. Ordinarily the overlapped, or possibly only abutted, edges of the tape will be sealed and secured together as by any suitable soldering or welding device such as is indicated in Fig. 1 to round out the picture.

The finished product then passes on to any appropriate propelling and take-up device not shown.

It is to be noted that it is important to avoid contact between the core and the tape until the latest moment possible, i. e. in the member 36, for the various folding operations, however delicately performed, tend to flatten the corrugations slightly and so to increase the over all length of the tape a little at each operation. Hence although the tape and core pass through the member 36 together and at the same speed, up to that point the tape lags decreasingly behind the core.

It is also to be noted that in some instances it may be possible to precurl only one edge of the tape, for example in order to have the under edge press up tightly against the upper edge after leaving the member 7. In such a case one pair of the rolls 22, 23 or 24, 25 will be cylindrical instead of convex and concave.

The embodiment of the invention herein disclosed is illustrative only and may be modified and departed from in many ways without departing from the spirit and scope of the invention as pointed out in and limited solely by the appended claims.

What is claimed is:

1. An apparatus for making cable comprising a core and a sheath thereon consisting of a transversely corrugated metal tape folded longitudinally about the core, the said apparatus comprising means to bend the transversely corrugated metal tape longitudinally into an arcuate form, means to bend the edge portions of the tape transversely while in that form, means to remove the longitudinal curvature, and means to fold the edge curled tape into a tube about a core.

2. A method of making cable comprising a core and a sheath thereon consisting of a transversely corrugated metal tape folded transversely about the core, the said method comprising the steps of first bending the transversely corrugated tape longitudinally into an arcuate form and while in that form bending the edge portions of the tape transversely, removing the curvature longitudinally of the tape, and folding the edge curved tape into a tube about a core.

3. A method of making cable comprising a core and a sheath thereon consisting of a transversely corrugated metal tape folded transversely about the core, the said method comprising the steps of advancing the metal tape longitudinally, advancing the core strand in association but out of contact therewith, bending the corrugated tape longitudinally into an arcuate form and while in that form bending the edge portions of the tape transversely, removing the curvature longitudinally of the tape, and folding the edge curved tape into a tube about a core.

4. A method of making cable comprising a core and a sheath thereon consisting of a transversely corrugated metal tape folded transversely about the core, the said method comprising the steps of advancing a transversely pre-corrugated metal tape longitudinally, advancing a core strand in association but out of contact therewith, bending the tape longitudinally into an arcuate form and while in that form bending the edge portions of the tape transversely, removing the curvature longitudinally of the tape, and folding the edge curved tape into a tube about a core while maintaining the core still out of contact with the tape, applying the tape to the core, and compacting the tape about the core.

5. A method of making cable comprising a core and a sheath thereon consisting of a transversely corrugated metal tape folded transversely about the core, the said method comprising the steps of first bending the transversely corrugated tape longitudinally into an arcuate form and while in that form bending the edge portions of the tape transversely, removing the curvature longitudinally of the tape, forming the middle portion of the tape into U-form transversely of the tape, and folding the tape into a tube about a core.

6. A method of making cable comprising a core and a sheath thereon consisting of a transversely corrugated metal tape folded transversely about the core, the said method comprising the steps of first bending the transversely corrugated tape longitudinally into an arcuate form and while in that form bending the edge portions of the tape transversely, removing the curvature longitudinally of the tape, forming the middle portion of the tape into U-form transversely of the tape while restraining the tape against lateral distortion by guiding the edges of the tape, and folding the tape into a tube about a core.

7. A method of making cable comprising a core and a sheath thereon consisting of a transversely corrugated metal tape folded transversely about the core, the said method comprising the steps of first bending the transversely corrugated metal tape longitudinally into an arcuate form and while in that form bending one edge portion only of the metal tape transversely, removing the curvature longitudinally of the tape, and folding the edge curved tape into a tube about a core.

8. A method of making cable comprising a core and a sheath thereon consisting of a transversely corrugated metal tape folded transversely about the core, the said method comprising the steps of first bending the transversely corrugated tape longitudinally into an arcuate form and while in that form bending the edge portions of the tape transversely, removing the curvature longitudinally of the tape, and forming the middle portion of the tape into U-form transversely of the tape while restraining the tape against lateral distortion by guiding the edges only of the tape.

9. An apparatus for making cable comprising a core and a sheath thereon consisting of a transversely corrugated metal tape folded about the core, the said apparatus comprising means for advancing the tape and the core, a pair of rollers for curving the tape transversely as the tape is advanced therebetween, a third roller cooperating with one of the first mentioned rollers to cause an arcuate curving of the tape longitudinally as the tape passes therebetween and during the transverse curving thereof, and means to remove the longitudinal curve from the tape.

10. An apparatus for making cable comprising a core and a sheath thereon consisting of a transversely corrugated metal tape folded about the core, the said apparatus comprising means for advancing the tape and the core, a pair of rollers between which the core is advanced, a roller cooperating with the pair of rollers for curving the tape longitudinally through an arc as the tape is advanced therebetween and guided thereby, and another pair of rollers cooperating with the first pair of rollers to curve the tape transversely during the longitudinal curving thereof.

11. An apparatus for making cable comprising a core and a sheath thereon consisting of a transversely corrugated metal tape folded about the core, the said apparatus comprising means for advancing the tape and the core, a pair of rollers between which the core is advanced, a roller cooperating with the pair of rollers for curving the tape longitudinally through an arc as the tape is advanced therebetween and guided thereby, another pair of rollers cooperating with the first pair of rollers to curve the tape transversely during the longitudinal curving thereof, and means to remove the longitudinal curve from the tape.

12. An apparatus for forming a tube from transversely corrugated tape, a concave rolling surface, a convex rolling surface cooperating therewith to transversely bend the tape, means for passing the material between said rolling surfaces, and a roller preceding said rolling surfaces and spaced from the convex roller a distance about the height of the corrugations of the tape to cause the tape to engage the convex rolling surface through an arc of substantial length prior to the transverse bending of the corrugated tape.

WILLIAM MORSING.